United States Patent
Xu et al.

(10) Patent No.: US 9,494,435 B2
(45) Date of Patent: Nov. 15, 2016

(54) DRIVING EVALUATION SYSTEM AND METHOD

(71) Applicant: XIAMEN KING LONG MOTOR VEHICLE INSPECTION CO., LTD., Xiamen, Fujian (CN)

(72) Inventors: Yifan Xu, Fujian (CN); Xiaobing Chen, Fujian (CN); Weihong Ye, Fujian (CN);
(Continued)

(73) Assignee: Xiamen King Long Motor Vehicle Inspection Co., Ltd., Xiamen (CN)

( * ) Notice: Subject to any disclaimer, the term of this patent is extended or adjusted under 35 U.S.C. 154(b) by 0 days.

(21) Appl. No.: 14/348,068

(22) PCT Filed: Jan. 10, 2013

(86) PCT No.: PCT/CN2013/070298
§ 371 (c)(1),
(2) Date: Mar. 28, 2014

(87) PCT Pub. No.: WO2013/117119
PCT Pub. Date: Aug. 15, 2013

(65) Prior Publication Data
US 2014/0358430 A1  Dec. 4, 2014

(30) Foreign Application Priority Data

Feb. 7, 2012 (CN) .......................... 2012 1 0025770

(51) Int. Cl.
*G01C 21/26* (2006.01)
*G07C 5/08* (2006.01)
*G01C 21/36* (2006.01)

(52) U.S. Cl.
CPC .......... *G01C 21/26* (2013.01); *G01C 21/3697* (2013.01); *G07C 5/0808* (2013.01)

(58) Field of Classification Search
CPC combination set(s) only.
See application file for complete search history.

(56) References Cited

U.S. PATENT DOCUMENTS 7,433,889 B1 * 10/2008 Barton .................. G01C 21/32
RE43,010 E  * 12/2011 Hoshino ................ B60R 25/04
                                                      340/426.22

(Continued)

*Primary Examiner* — Thomas Tarcza
*Assistant Examiner* — Richard Goldman (57) ABSTRACT

A system and method for evaluating driver performance is provided. The system includes a GPS navigation module for locating a running vehicle; a running vehicle data collection module for collecting data of the vehicle; a vehicle specifications memory for storing specifications of the vehicle; a road maps memory for storing maps of an area so as to identify the location of the vehicle by cooperating with the GPS navigation module; a road evaluation parameters memory for storing road evaluation parameters of the vehicle, and outputting evaluation parameters of the vehicle by cooperating with the road maps memory; and an evaluation module for combining the data of the vehicle from the running vehicle data collection module, the road evaluation parameters of the vehicle from the road evaluation parameters memory, and the specifications of the vehicle from the vehicle specifications memory, evaluating the combination, and outputting an evaluation report.

1 Claim, 8 Drawing Sheets

(72) Inventors: Fangming Zhou, Fujian (CN); Beisi Lin, Fujian (CN)

(56) References Cited

U.S. PATENT DOCUMENTS

| | | | | |
|---|---|---|---|---|
| 8,140,241 B2* | 3/2012 | Takeda | .................. | B60W 30/16 701/70 |
| 2003/0208313 A1* | 11/2003 | Wells | ................. | G01C 21/3492 701/465 |
| 2004/0243285 A1* | 12/2004 | Gounder | ................ | G07C 5/008 701/1 |
| 2006/0155439 A1* | 7/2006 | Slawinski | ............ | G07C 5/0858 701/33.4 |
| 2007/0124072 A1* | 5/2007 | Nakayama | ......... | G01C 21/3658 701/431 |
| 2007/0239322 A1* | 10/2007 | McQuade | .............. | G07C 5/008 701/1 |
| 2008/0027636 A1* | 1/2008 | Tengler | .............. | G01C 21/3484 701/425 |
| 2008/0255722 A1* | 10/2008 | McClellan | ............ | B60R 25/102 701/31.4 |
| 2008/0255754 A1* | 10/2008 | Pinto | .................. | G01C 21/3691 701/119 |
| 2009/0091439 A1* | 4/2009 | Sekiyama | .......... | G01C 21/3697 340/459 |
| 2009/0234572 A1* | 9/2009 | Matsuo | .............. | G01C 21/3679 701/533 |
| 2009/0240656 A1* | 9/2009 | Tanabe | .................... | H04W 4/02 |
| 2009/0299594 A1* | 12/2009 | Harumoto | ......... | B60W 50/0098 701/70 |
| 2010/0047744 A1* | 2/2010 | Miura | .................. | B60W 40/09 434/66 |
| 2010/0076675 A1* | 3/2010 | Barth | ................. | G01C 21/3469 701/532 |
| 2010/0087984 A1* | 4/2010 | Joseph | .................. | G09B 19/16 701/31.4 |
| 2010/0100307 A1* | 4/2010 | Kim | ...................... | G01S 5/0027 701/119 |
| 2010/0109908 A1* | 5/2010 | Miura | ................. | B60R 16/0232 340/905 |
| 2010/0179748 A1* | 7/2010 | Choi | ...................... | G01C 21/32 701/117 |
| 2010/0292916 A1* | 11/2010 | Kurciska | ............ | G01C 21/3453 701/533 |
| 2011/0043635 A1* | 2/2011 | Fujita | .................... | B60W 40/09 348/149 |
| 2011/0125392 A1* | 5/2011 | Hao | ..................... | G08G 1/0104 701/118 |
| 2011/0153189 A1* | 6/2011 | Chiang | .............. | G01C 21/3492 701/533 |
| 2011/0166773 A1* | 7/2011 | Raz | ....................... | B60W 40/09 701/123 |
| 2011/0224891 A1* | 9/2011 | Iwuchukwu | ...... | G08G 1/096716 701/117 |
| 2011/0301802 A1* | 12/2011 | Rupp | ................... | G08G 1/0112 701/408 |
| 2012/0062418 A1* | 3/2012 | Levy | ....................... | G01S 19/20 342/357.58 |
| 2012/0172023 A1* | 7/2012 | Griff | ................... | H04L 12/2602 455/418 |
| 2012/0173530 A1* | 7/2012 | Kurciska | ........... | G06F 17/30241 707/738 |
| 2012/0280835 A1* | 11/2012 | Raz | ....................... | G08G 1/0112 340/905 |
| 2013/0069773 A1* | 3/2013 | Li | .......................... | B60K 28/02 340/426.1 |
| 2013/0151088 A1* | 6/2013 | Ricci | ....................... | G06F 17/00 701/51 |
| 2013/0226365 A1* | 8/2013 | Brozovich | ............ | G06Q 50/30 701/1 |
| 2014/0188388 A1* | 7/2014 | Malahy | ................ | G01C 21/367 701/533 |
| 2014/0195074 A1* | 7/2014 | Hunt | ................... | F02D 41/2487 701/2 |
| 2014/0195106 A1* | 7/2014 | McQuade | ............ | G07C 5/0841 701/33.9 |
| 2014/0214322 A1* | 7/2014 | Tsimhoni | ................ | G01C 21/34 701/534 |
| 2014/0244158 A1* | 8/2014 | Wynter | .............. | G01C 21/3691 701/423 |
| 2014/0278574 A1* | 9/2014 | Barber | .................. | B60W 40/09 705/4 |
| 2014/0358430 A1* | 12/2014 | Xu | ....................... | G07C 5/0808 701/461 |
| 2014/0365029 A1* | 12/2014 | Sugimoto | ............. | B60W 40/09 701/1 |
| 2014/0365088 A1* | 12/2014 | Jeon | .................... | B60W 30/182 701/51 |
| 2015/0006132 A1* | 1/2015 | Matsumura | .......... | G08G 1/0112 703/2 |
| 2015/0057931 A1* | 2/2015 | Pivonka | ............ | G01C 21/3484 701/533 |

\* cited by examiner

DRIVING EVALUATION SYSTEM AND METHOD

BACKGROUND OF THE INVENTION

1. Field of the Invention

The invention relates to a system and method for monitoring driver behavior and more particularly to a system and method for evaluating driver performance.

2. Description of Related Art

How to monitor driver behavior of a group of motor vehicles (i.e., grading the performance of each driver) is an important issue. Further, good driving habits contribute greatly to road safety, fuel economy and vehicle maintenance.

A great number of driver performance evaluation systems and methods are disclosed. For example, Chinese Patent Application No. 200910206340.9 discloses a system for grading the performance of a driver of a motor vehicle. The system is characterized in that a counter is used to count the driver's braking times and the driver's emergency braking times when driving. Above two counts are used to grade performance of a driver. Chinese Patent Application No. 200980152852.X discloses a system for grading the performance of a driver of a motor vehicle based on fuel economy. The system further discloses different grading criteria for evaluating driver performance based on driving experience of respective drivers.

However, above two patents have the following drawbacks:

Either safety or fuel economy is taken into consideration in the evaluation. Thus, it is limited. Further, focusing on one factor may compromise the other factor, resulting in either poor fuel economy or dangerous driver behavior.

Secondly, the evaluation criteria of each of the evaluation systems disclosed in the two Chinese Patents are not applicable to all drivers.

In addition, an alerting message of each of the evaluation systems disclosed in the two Chinese Patents is shown during driving, but the alerting manner is not desired for drivers.

Moreover, displayed alerting message does not contain constructive information. Thus, it does not help a driver stop bad driving habits.

Thus, the need for improvement still exists.

SUMMARY OF THE INVENTION

It is therefore one object of the invention to provide a system and method for evaluating driver performance for eliminating drawbacks including limited applications and incorrect evaluation associated with the prior art.

In one aspect of the invention, there is provided a system for evaluating driver performance comprising a GPS navigation module for locating a vehicle driven by a driver; a running vehicle data collection module for collecting data of the vehicle; a vehicle specifications memory for storing specifications of the vehicle; a road maps memory for storing a plurality of maps of an area so as to identify the location of the vehicle by cooperating with the GPS navigation module; a road evaluation parameters memory for storing road evaluation parameters of the vehicle, and outputting a plurality of evaluation parameters of the vehicle by cooperating with the road maps memory; and an evaluation module for combining the data of the vehicle from the running vehicle data collection module, the road evaluation parameters of the vehicle from the road evaluation parameters memory, and the specifications of the vehicle from the vehicle specifications memory, evaluating the combination, and outputting an evaluation report.

There is further comprised of a calculation module for calculating the evaluation report by adding weights to the road evaluation parameters of the vehicle in order to obtain evaluation data of the driver; and an evaluation data memory for storing the evaluation data of the driver from the calculation module, analyzing the evaluation data of the driver, and giving suggestions to the driver based on the analysis.

There is further comprised of a human interface module for allowing the driver to input information of the vehicle, the information including load and road conditions and wherein the human interface module is connected to the evaluation module for sending the information thereto, and the human interface module receives and displays the analysis and the suggestions from the evaluation data memory.

There is further comprised of a custom parameters data memory for storing customized configuration of a plurality of road evaluation parameters, and wherein the custom parameters data memory is connected to the calculation module so as to implement the customized configuration in driver evaluation data.

There is further comprised of a plurality of vehicle terminals each with the GPS navigation module, the running vehicle data collection module, the vehicle specifications memory, the evaluation module, and the human interface module mounted therein; and an information center with the road maps memory, the road evaluation parameters memory, the calculation module, and the evaluation data memory mounted therein; and wherein each of the vehicle terminals further comprises a first wireless communication module, and the information center further comprises a second wireless communication module.

In another aspect of the invention, there is provided a method for evaluating driver performance comprising locating a vehicle by using a GPS navigation module at each of a plurality of evaluation periods of time; collecting data of a vehicle driven by a driver; determining the location of the vehicle by inquiring a road maps memory; retrieving evaluation parameters from a road evaluation parameters memory corresponding to the location of the vehicle wherein the evaluation parameters correspond to map data of the road maps memory, and the evaluation parameters and weights of the evaluation parameters are preset based on road conditions; evaluating performance of a driver based on the data of the vehicle, the evaluation parameters, and vehicle information; and outputting an evaluation report wherein the vehicle information includes specifications of the vehicle.

There is further comprised of the steps of adding weights to the report by adding weights of the evaluation parameters of the road evaluation parameters memory to the evaluation report to obtain weighted evaluation data; storing evaluation data of a driver; analyzing the evaluation data of the driver; and giving suggestions to the driver based on the analysis.

There is further comprised of the steps of creating a historical scoring database based on the analysis and suggestions; and showing the historical scoring database on a display when the vehicle runs on a road travelled before.

There is further comprised of the step of adding a second weight to the evaluation report wherein the second weight is set by a user.

The invention has the following advantages:

The invention evaluates driver performance per a predetermined period of time for a predetermined distance. In detail, the GPS navigation module is employed to access the current location information of a vehicle, determine the current location of the vehicle based on road maps stored in the road maps memory, access evaluation parameters of the current location from the road evaluation parameters memory, combine the accessed running vehicle data with the vehicle information, and conduct an evaluation. As a result, a driver performance report is obtained.

The invention gets running vehicle data from the running vehicle data collection module. The data includes, per requirements, fuel economy, safety, and parameters for ensuring a fair evaluation. In other words, the invention can dynamically adjust data types of a running vehicle at any time based on requirements and it is a contrast to the conventional art which only collects a single data type for evaluation. Thus, the invention has a wide basis for ensuring a fair evaluation. Moreover, the invention comprises the vehicle specifications memory for ensuring an evaluation conducted with the current vehicle specifications being taken into consideration. This means that the evaluation is applicable to different makes, thereby greatly increasing commonness to all vehicles.

The above and other objects, features and advantages of the invention will become apparent from the following detailed description taken with the accompanying drawings.

LIST OF REFERENCE NUMERALS 100 system for evaluating driver performance
1 vehicle terminal
11 GPS navigation module
12 running vehicle data collection module
13 vehicle specifications memory
14 evaluation module
15 human interface module
16 display
2 information center
21 road maps memory
22 road evaluation parameters memory
23 custom parameters data memory
24 calculation module
25 evaluation data memory
3 wireless communication module

DETAILED DESCRIPTION OF THE INVENTION

The invention will be best understood from the following detailed description taken with the accompanying drawings.

Figure 1:
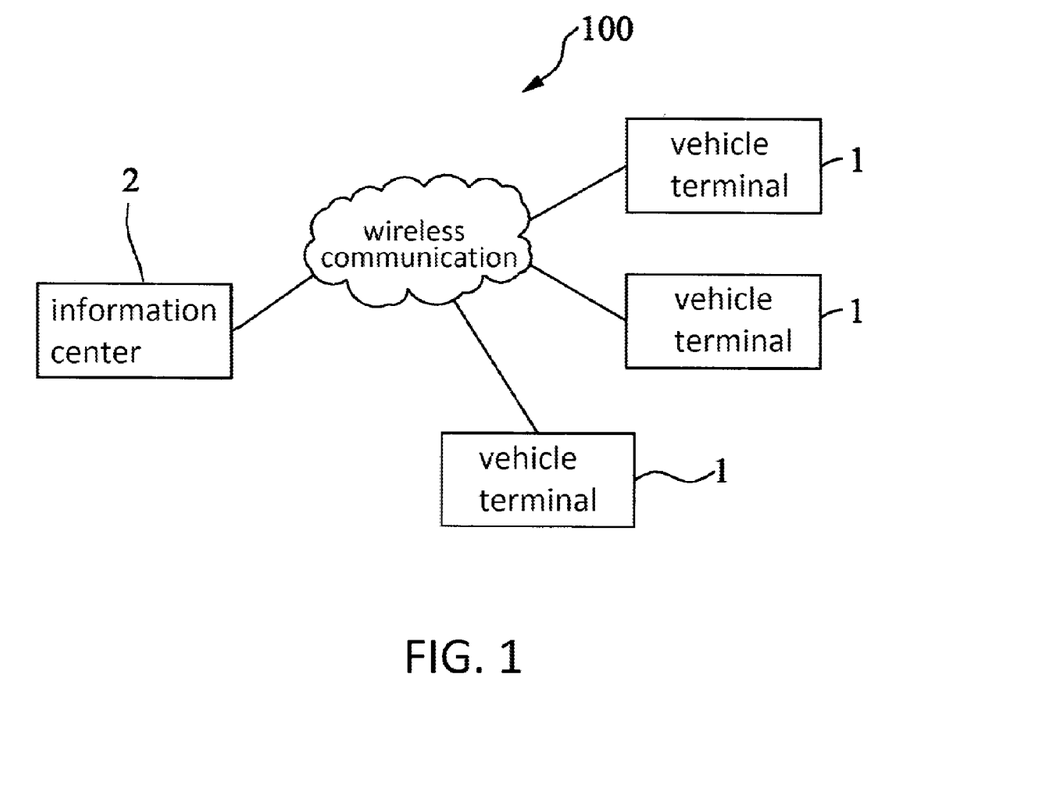
FIG. 1 is a schematic of a system for evaluating driver performance according to the invention.
Figure 2:
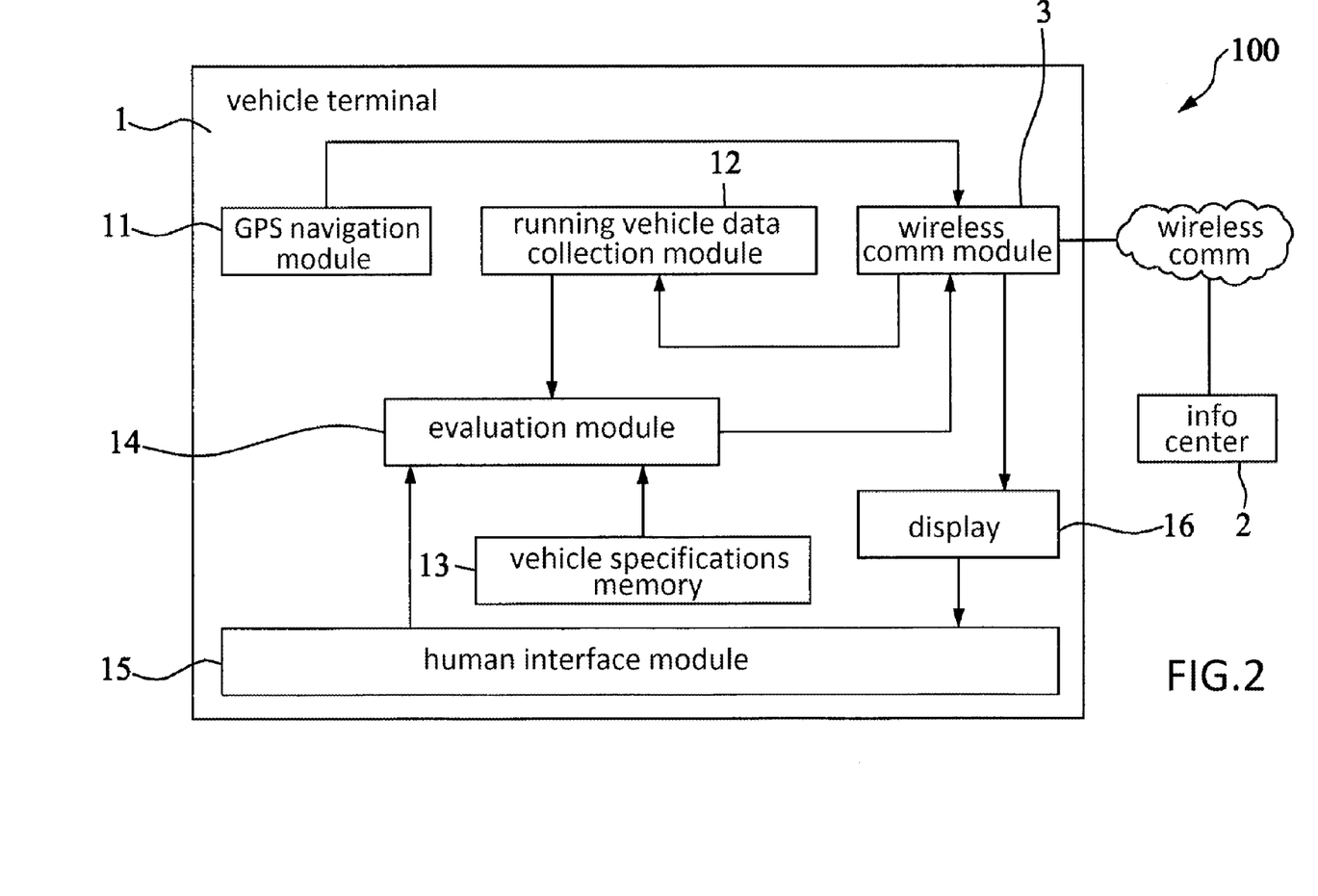
FIG. 2 is a schematic detailing the vehicle terminal in block diagram.
Figure 3:
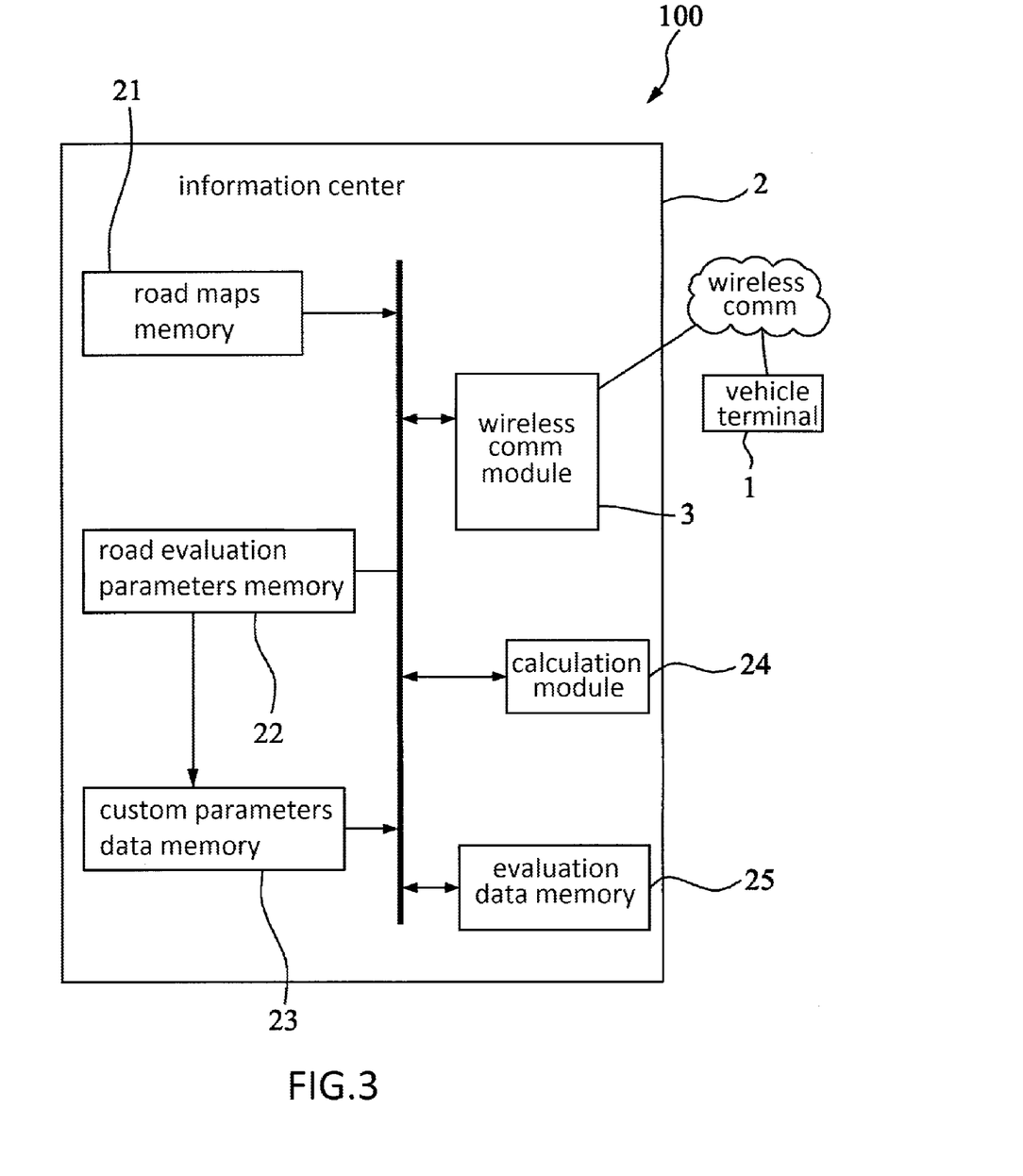
FIG. 3 is a schematic detailing the information center in block diagram.
Figure 4:
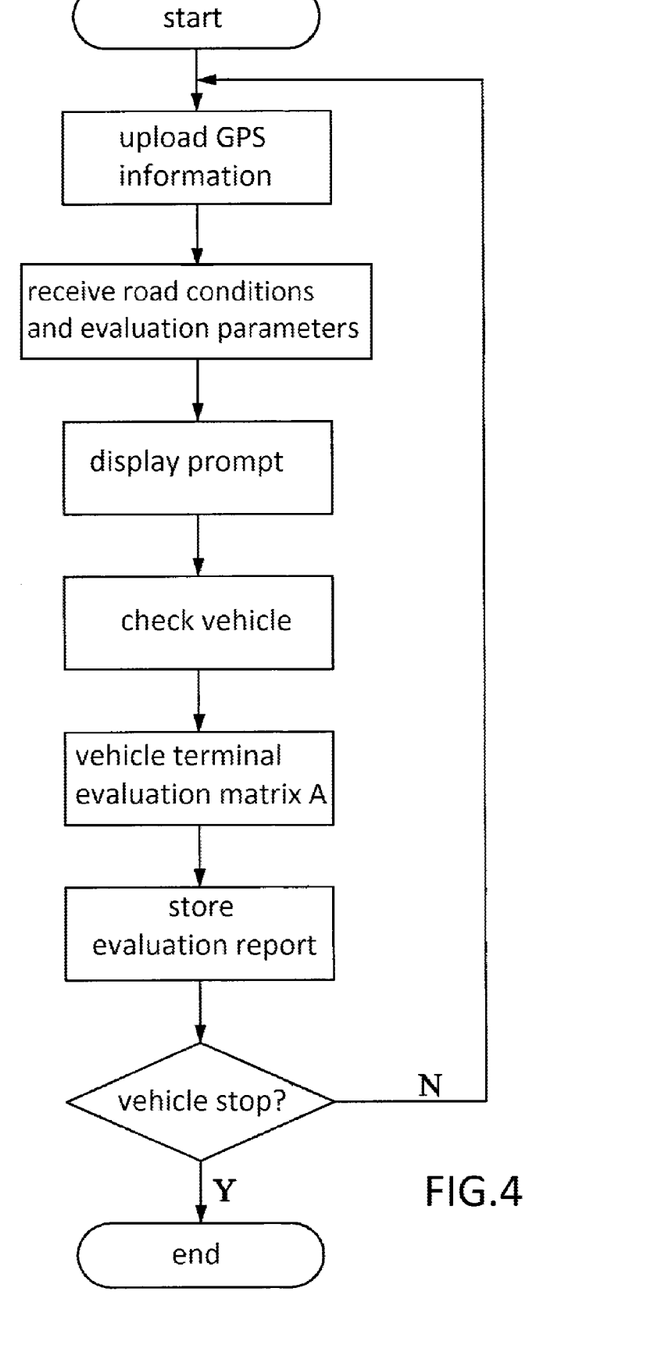
FIG. 4 is a flowchart illustrating a method for evaluating driver performance in the vehicle terminal according to the invention.
Figure 5:
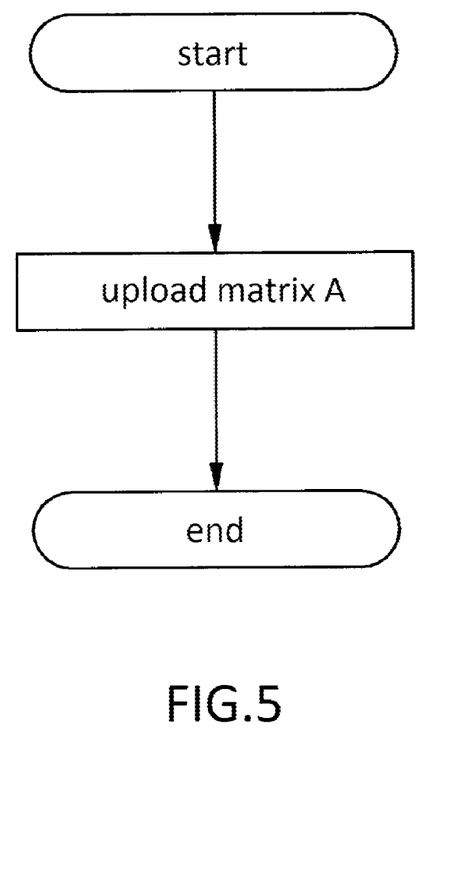
FIG. 5 is another flowchart illustrating a method for evaluating driver performance in the vehicle terminal according to the invention.
Figure 6:
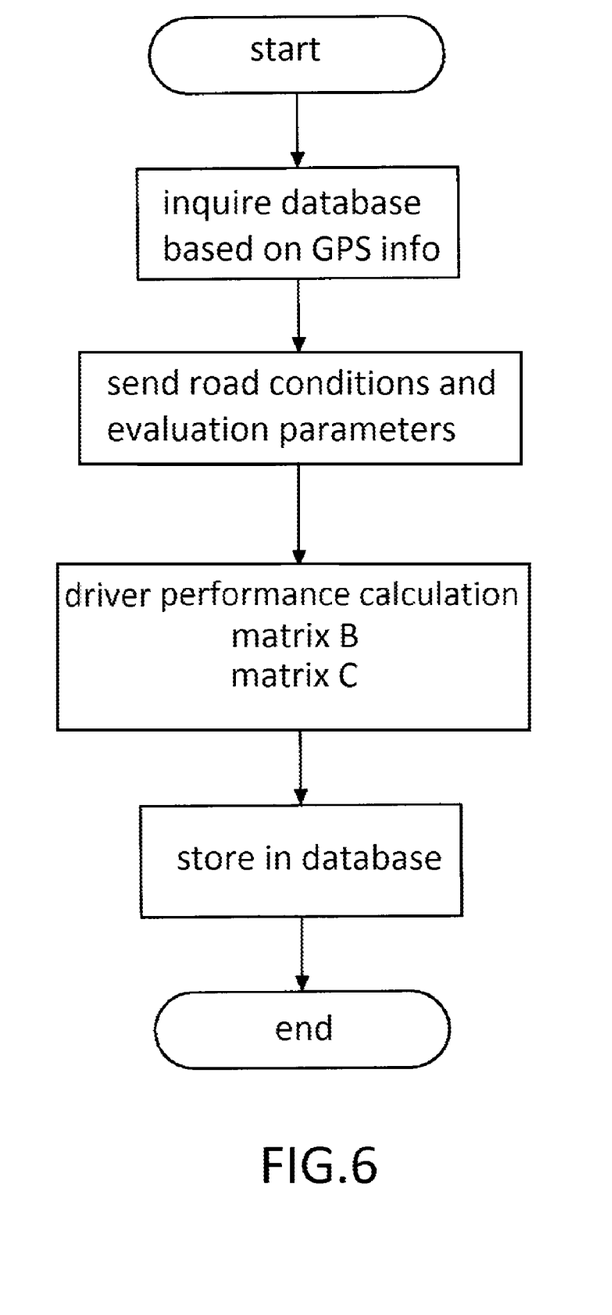
FIG. 6 is a flowchart illustrating a method for evaluating driver performance in the information center according to the invention.
Figure 7:
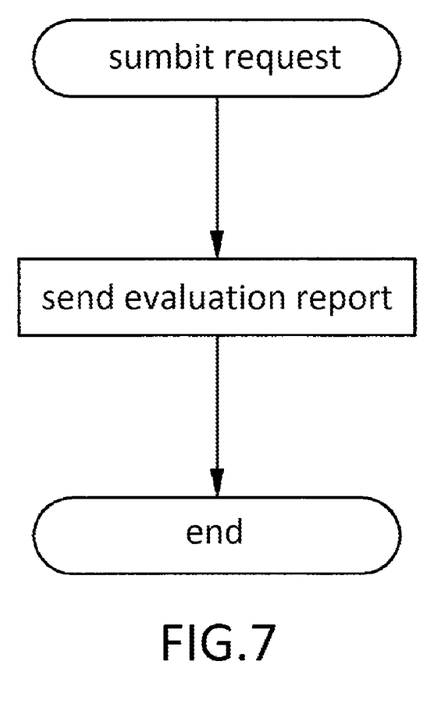
FIG. 7 is another flowchart illustrating a method for evaluating driver performance in the information center according to the invention.

Referring to FIGS. 1 to 3, a system for evaluating driver performance in accordance with a preferred embodiment of the invention is generally designated by 100. The system 100 comprises a plurality of vehicle terminals 1, an information center 2, and wireless communication for communicating the vehicle terminals 1 with the information center 2. The vehicle terminal 1 and the information center 2 each comprise a wireless communication module 3 which is a well known device. Thus, a detailed description of wireless communication module is omitted herein for the sake of brevity.

As shown in FIG. 2, the vehicle terminal 1 further comprises a GPS (Global Positioning System) navigation module 11, a running vehicle data collection module 12, a vehicle specifications memory 13, and an evaluation module 14. The information center 2 further comprises a road maps memory 21, and a road evaluation parameters memory 22.

The GPS navigation module 11 comprises a GPS antenna and a GPS receiver for obtaining vehicle location information in a manner known in the art. The information is sent to the road maps memory 21 in the information center 2 for positioning a vehicle. In the preferred embodiment, the information transmission is carried out by the wireless communication module 3 of the vehicle terminal 1 and the wireless communication module 3 of the information center 2.

The running vehicle data collection module 12 is used to collect data of a running vehicle. In detail, all data is collected with weights added to evaluation parameters so as to delete redundant parameters. Preferably, the running vehicle data collection module 12 collects data after receiving evaluation parameters sent from the information center 2. This has the benefit of increasing data collection efficiency of running vehicles. For vehicles having electric engine and Internet access capability, data can be collected via CAN (controller area network) mounted thereon. This increases usability of the system. For data not collected, additional sensors are required to install for data collection purpose. In detail, data deemed necessary for running vehicles is based on evaluation. Data may include, fuel economy, safety, and parameters for ensuring a fair evaluation.

The vehicle specifications memory 13 is used to store vehicle specifications and parameters. In detail, it stores cruising speed, fuel consumption per kilometer, make, and acceleration features of a vehicle. Data stored in the vehicle specifications memory 13 is critical to the result of evaluating the same parameter. Different criteria are used to evaluate emergency brake, acceleration, and cruising speed of each of different vehicles.

The evaluation module 14 is used to receive data collected by the running vehicle data collection module 12, and vehicle specifications and parameters stored in the memory 13, make an evaluation on them so as to grade the performance of a driver of a vehicle, and output the grade to an appropriate device. For example, the evaluation module 14 checks speed of a running vehicle and compares it with cruising speed of the vehicle stored in the vehicle specifications memory 13. Score one is recorded on the check item if the speed of the vehicle is about the same as the cruising speed.

The road maps memory 21 is used to store road maps. Position of the vehicle is determined based on the road maps and location information accessed from the GPS navigation module 11. The road maps include road information, routes, speed limits, and real time road conditions. In detail, in the preferred embodiment after the wireless communication module 3 of the information center 2 receiving GPS location signals of the vehicle, the road maps memory 21 inquires and determines the correct location of the vehicle and associated road conditions which are in turn sent to the vehicle terminal 1 by the wireless communication module 3 of the information center 2.

The road evaluation parameters memory 22 is used to store road evaluation parameters which correspond to road maps stored in the road maps memory 21. Further, roads having similar conditions on the maps and contiguous roads are designated as the same road block. Evaluation parameters and parameter weights are added to the road block. In detail, in the preferred embodiment the road with the vehicle driving thereon is located in the road maps memory 21 with the help of GPS location information. Thereafter, evaluation parameters corresponding to the road are found by searching the road evaluation parameters memory 22. Finally, the evaluation parameters are sent to the vehicle terminal 1 via the wireless communication module 3 of the information center 2.

In such a manner, the invention evaluates driver performance per a predetermined period of time for a predetermined distance. In detail, the GPS navigation module 11 is employed to access the current location information of a vehicle, determine the current location of the vehicle based on road maps stored in the road maps memory 21, access evaluation parameters of the current location from the road evaluation parameters memory 22, combine the accessed running vehicle data with the vehicle information, and conduct an evaluation. As a result, a driver performance report is obtained.

In such a manner, the invention gets running vehicle data from the running vehicle data collection module 12. The data includes, per requirements, fuel economy, safety, and parameters for ensuring a fair evaluation. In other words, the invention can dynamically adjust data types of a running vehicle at any time based on requirements and it is a contrast to the conventional art which only collects a single data type for evaluation. Thus, the invention has a wide basis for ensuring a fair evaluation. Moreover, the invention comprises the vehicle specifications memory 13 for ensuring an evaluation conducted with the current vehicle specifications being taken into consideration. This means that the evaluation is applicable to different makes, thereby greatly increasing commonness to all vehicles.

As shown in FIG. 3, the information center 2 further comprises a calculation module 24 and an evaluation data memory 25. The calculation module 24 obtains driver performance data by calculating the evaluation of a driver outputted from the evaluation module 14 based on the weights of the evaluation parameters of the road evaluation parameters memory 22. The evaluation data memory 25 is used to store all driver performance data obtained by the calculation module 24, analyze it, and giving suggestions.

The driver performance data includes raw data of each item, initial score, average score, final score, vehicle specifications, road conditions, and time. The data stored in the evaluation data memory 25 is used to analyze driver behavior and provide suggestions which can be sent to a display of an electronic device used by a driver via the Internet with the performance of a driver being graded and shown on the display. Moreover, suggestions are given to the driver. In addition, history records of driver performance are available so that a driver can see it as an indication whether his or her driving habits have improved or not. This is a continuous training program for drivers.

For providing personal services, the information center 2 further comprises a custom parameters data memory 23 for storing customized configuration of road evaluation parameters. The custom parameters data memory 23 is connected to the calculation module 24 so that the customized configuration can be implemented in driver evaluation data. The custom parameters data memory 23 can store data selected by a user for evaluating driver performance, and adjust weights of the parameters based on applications. For example, weights of speeding can be increased if stopping speeding is cracked down. The obtained evaluation is appropriate to different users by configuring evaluation data again.

As shown in FIG. 2, the system 100 further comprises a human interface module 15 for allowing a driver to input running vehicle data including load and road conditions which can be used as reference to the evaluation module 14. For example, the cruising speed will be increased to a higher range if the vehicle is running on a highway or decreased to a lower range if the vehicle is running with no load.

Figure 8:
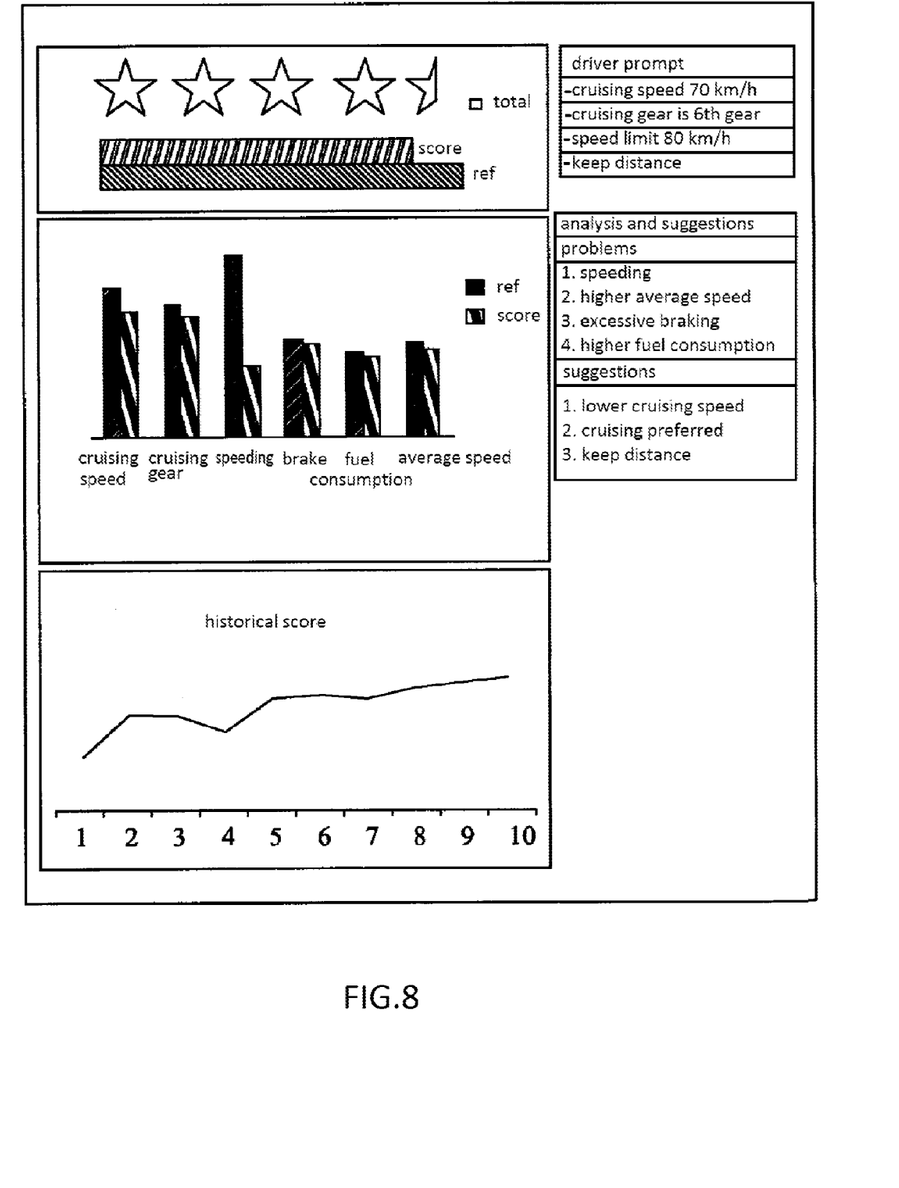
FIG. 8 shows exemplary information shown on a human interface module according to the system for evaluating driver performance of the invention.

Referring to FIG. 8, exemplary information is shown on the human interface module 15 of the system 100. The human interface module 15 can be used to train drivers. In detail, the human interface module 15 combines vehicle specifications and parameters of the vehicle specifications memory 13 with evaluation data provided by the information center 2 to provide suggestions to a driver. Evaluation data released by the information center 2 regards information of gear and speed of a running vehicle when the vehicle enters a specified road block. The information is stored in the vehicle specifications memory 13 for evaluating driver performance of the invention. For example, the cruising speed of a vehicle is 90 km at sixth gear. Thus, sixth gear 90 km is prompted for alerting a driver that it is optimum for decreasing fuel consumption. For driving in urban areas, evaluation data released by the information center 2 aims at preventing the driver from idling for a prolonged period of time, from performing quick acceleration, and from performing quick deceleration. Messages of "turning off the engine when idling for a long time", "smoothly pressing the gas pedal", "keeping distance", "avoiding quick deceleration", etc. are prompted for alerting a driver.

The human interface module 15 can be further used to analyze driver behavior after finishing a predetermined distance of driving. In detail, score of each item of the evaluation of a driver is compared with an average score of the same item of the evaluation of other drivers. Suggestions are given to the driver if his or her score is less than the average score. For example, the evaluation of a driver includes low score in middle gear, normal score in cruising speed, and high fuel consumption due to long time driving at low gear. Final score and suggestions message including "please drive at high gear when cruising for decreasing fuel consumption" are prompted to the driver.

As shown in FIG. 2, the vehicle terminal 1 further comprises a display 16 for showing processing results. In detail, the information center 2 sends evaluation and suggestions message to the display 16 via the wireless communication. What is shown on the display may include total score, score of each item, historical data, and suggestions message.

Referring to FIGS. 4 to 7 in conjunction with FIGS. 1 to 3 and 8, a method for evaluating driver performance in accordance with the invention is illustrated in a number of flowcharts. The method comprises the steps of:

Step 1: getting a current position of a vehicle by using a GPS navigation module 11 at every predetermined period of time; and collecting data of a running vehicle;

Step 2: determining the current position of the vehicle by inquiring the road maps memory 21; and retrieving evaluation parameters from the road evaluation parameters memory 22 corresponding to the current position of the vehicle wherein the evaluation parameters of the road evaluation parameters memory 22 correspond to the map data of the road maps memory 21, and the evaluation parameters and the weights are preset based on road conditions; and Step 3: evaluating the performance of a driver based on the data of the running vehicle, the evaluation parameters, and vehicle information; and outputting an evaluation report wherein the vehicle information includes specifications of the vehicle.

Preferably, the method further comprises:

Step 4: adding weights to the evaluation report, that is, adding weights of the evaluation parameters of the road evaluation parameters memory 22 to the evaluation report to obtain weighted evaluation data. Specifically, adding weights to the evaluation report for two times wherein the weights are set by respective users. That is, the custom parameters data memory 23 is used to set the weights.

Preferably, the method further comprises:

Step 5: storing evaluation data of all drivers; analyzing the evaluation data of the drivers; and giving suggestions based on the analysis.

Preferably, the method further comprises:

Step 6: creating a historical scoring database based on the analysis and suggestions; and showing the historical scoring database on a display when the vehicle runs at the same road section.

Preferably, the evaluation parameters of the invention comprise:

Economy items: Cruising speed. Optimum gear. No long time idling. Decrease of the number of braking. Smooth pressing of gas pedal and smooth sliding movement. Other operations including avoiding low air conditioning temperature, and avoiding opening the door for a long time when air conditioning are activated.

Safety items: No speeding. No sliding movement while idling. Turning on indicator light when changes driving direction. No emergency brake. Other items include fuel consumption and average speed for ensuring a fair evaluation.

The number of above items can be increased or decreased based on requirements, the number of sensors mounted on the vehicle, etc. The selected evaluation parameters do not limit the scope of the invention. Specifically, the evaluation report can be arranged in a matrix A:

$$A = (a_1 + a_2 + a_3 + \ldots)^T$$

where a1, a2, a3, . . . represent evaluation report of respective items. Parameters of matrix A are classified into two types: One is 0 or 1. For example, the parameter is set to 1 if the vehicle idles for a long time or is set to 0 otherwise. The other is 1, 2, or 3. For example, the parameter is set to 1 if speeding for more than 10%, the parameter is set to 2 if speeding for more than 20%, and the parameter is set to 3 if speeding more than 30%.

Matrix A can be obtained by using the vehicle terminal 1 to calculate vehicle running data based on vehicle information and maps data. Time lapsed from vehicle start to vehicle stop is divided into a plurality of time segments. The vehicle terminal 1 successively evaluates each parameter of the matrix A in each time segment. Value of a corresponding parameter of the matrix A is changed if there is a condition being detected in the time segment. The matrix A is an aggregate of numerals having time segment as subscript representing the evaluation report. Speeding is defined in terms of vehicle speed and speed limit of the road. For example, a is 1 if speeding is detected in a time segment. The value of a remains 1 if the speeding continues in a next time segment. The value of a is 0 if the speeding is not detected in the next time segment.

A matrix N is created by a plurality of weights arranged diagonally wherein evaluation data stored in the road evaluation parameters memory 22 are expressed by weighted parameters in the matrix A:

$$N = \begin{bmatrix} n_1 & & & \\ & n_2 & & \\ & & n_3 & \\ & & & \ldots \end{bmatrix}$$

where n1 is the weight of a1, n2 is the weight of a2, . . . . Certain areas are not appropriate for evaluating driver performance. For example, in urban areas cruising speed of a vehicle is not possible oftentimes. Thus, n is set to 0. Different weights are given to different evaluation parameters when road conditions are taken into consideration. For example, weights of parameters representing highway, optimum gear, and cruising speed are higher. Parameters representing congested roads in cities, long time idling, and gas pedal control are given higher weights. Good driving behavior has weight n>0, and bad driving behavior has weight n<0.

A matrix M is created by a plurality of weights arranged diagonally wherein custom parameters data stored in the custom parameters data memory 23 are expressed by weighted parameters in the matrix M:

$$M = \begin{bmatrix} m_1 & & & \\ & m_2 & & \\ & & m_3 & \\ & & & \ldots \end{bmatrix}$$

where all elements in the matrix M are 1. A user may alter the value of each element depending on requirements. Parameter n can be set to 0 and it means that the user do not want to participate the evaluation.

Fair score is expressed as follows:

$$B = (b_1 + b_2 + b_3 + \ldots)^T$$

$$B = A \times N \cdot \alpha \cdot \beta$$

where $\alpha$ and $\beta$ are amended fuel consumption parameter and amended average vehicle speed respectively and are obtained by using the information center 2 based on fuel consumption of the vehicle on the road and average vehicle speed and weights. This is for preventing a driver from repeatedly driving through his or her favored road section (i.e., high score). B is the fair score and b1, b2, b3, . . . are scores of respective items.

Final score is expressed as follows:

$$C=(c_1+c_2+c_3+\ldots)^T$$

$$C=B \times M$$

where c is the final score, and c1, c2, c3, . . . are scores of respective items.

The system 100 can be implemented in the method illustrated in FIGS. 4 to 7. In detail, the system 1 sends obtained GPS location information to the information center 2 via wireless communication and submits an evaluation parameters request. After receiving GPS location information, the information center 2 retrieves road data and corresponding evaluation parameters and send same to the vehicle terminals 1 via wireless communication. After receiving the road data and corresponding evaluation parameters, the vehicle terminal 1 alerts a driver by suggesting the driver to drive carefully. When the vehicle is moving at a specified area (which has road sections having same evaluation parameters as discussed in above paragraphs regarding driver evaluation parameters database), a driver performance is evaluated per time segment, and the evaluation is used to create a matrix A which is temporarily stored in the vehicle terminal 1. Matrix A is regularly sent to the information center 2. Above steps are repeated until the vehicle stops. The information center 2 calculate the received matrix A by using N, α, β, and M. Thereafter, the calculation result and data are stored in an evaluation database. The information center 2 may, as requested by the vehicle terminal 1 or a user terminal, send the evaluation report to corresponding devices.

Driver training can output evaluation data to a display of the terminal device (e.g., the vehicle terminals 1 or other user terminals connected to the system 100) after finishing one or more times of driving. In FIG. 8, total score, item scores, historical score, and driver behavior analysis and suggestion are shown.

The invention is characterized in that evaluation is done on a driver for each running distance, the system 100 analyzes the evaluation and gives suggestion to the driver based on the analysis, a historical scoring database is created for accessing whether improvements have been made by a driver, drivers are encouraged to improve driving habits by following the suggestions, and a continuing driver training is carried out. When driving, the system 100 may alert a driver based on road conditions obtained from the road maps memory 21 wherein the alert includes special points that should be reminded based on the historical scoring database. The invention can greatly improve driver behavior, increase safety, increase fuel economy, decrease vehicle maintenance cost, and prolong a useful life of the vehicle by alerting a driver while driving and giving suggestions after evaluating driver performance.

Although the invention has been described in detail, it is to be understood that this is done by way of illustration only and is not to be taken by way of limitation. The scope of the invention is to be limited only by the appended claims.

What is claimed is:

1. A driver performance evaluation system comprising:
a GPS (Global Positioning System) navigation module configured to locate a vehicle driven by a driver;
a vehicle data collection module configured to collect data of the vehicle;
a vehicle specifications memory configured to store specifications of the vehicle;
a road maps memory configured to store a plurality of maps of an area, the road maps memory cooperating with the GPS navigation module to identify a road where the vehicle is located;
a road evaluation parameters memory configured to store road evaluation parameters corresponding to the maps of the area;
an evaluation module configured to determine scores of the road evaluation parameters based on the data of the vehicle and the specifications of the vehicle, and output an evaluation report;
a calculation module configured to modify the evaluation report by adding weights to the road evaluation parameters to further determine information pertinent to the driver, and calculate the evaluation report wherein the calculation of the evaluation report is a manipulation of data to be utilized to procure driver data;
an evaluation data memory configured to store the evaluation data of the driver, analyze the evaluation data of the driver, and give suggestions to the driver based on the analysis;
a human interface module configured to allow the driver to input information of the vehicle, the information including load and road conditions and wherein the human interface module is connected to the evaluation module to send the information thereto, and the human interface module receives and displays the analysis and the suggestions;
a custom parameters data memory configured to store customized configuration of a plurality of road evaluation parameters, and wherein the custom parameters data memory is connected to the calculation module to implement the customized configuration in the evaluation data of the driver;
a plurality of vehicle terminals each having the GPS navigation module, the vehicle data collection module, the vehicle specifications memory, the evaluation module, and the human interface module, each vehicle terminal further comprising a first wireless communication module; and
an information center having the road maps memory, the road evaluation parameters memory, the calculation module, and the evaluation data memory, the information center further comprising a second wireless communication module.

* * * * *